United States Patent Office 3,081,297
Patented Mar. 12, 1963

3,081,297
NEW 3-OXO-6α-HALOGEN-16α-METHYL-17α-HYDROXY-PREGNANES AND PROCESS FOR THEIR MANUFACTURE
Albert Wettstein, Riehen, and Georg Anner and Jindrich Kebrle, Basel, Switzerland, assignors to Ciba Corporation, a corporation of Delaware
No Drawing. Filed Feb. 9, 1960, Ser. No. 7,546
Claims priority, application Switzerland Feb. 12, 1959
10 Claims. (Cl. 260—239.55)

Among the derivatives of hydrocortisone, those with a 16α-methyl group and a 6α-halogen substituent, especially 6α-fluoro-16α-methyl-hydrocortisone and 6α-chloro-16α-methyl-hydrocortisone, their 9α-halogen derivatives and their 1-dehydro derivatives show an especially high biological action in the liver glycogen and granuloma tests. Above all, they do not produce the undesired side-effect of sodium retention, or, if they do, then only to a minor extent, and they are therefore especially valuable corticosteroids having an anti-inflammatory action.

The present invention relates to a process for the manufacture of important intermediate products for the synthesis of the aforementioned therapeutically active compounds from readily obtainable starting materials, such as e.g. the 16-dehydro-pregnenolone which is readily obtainable in any quantity from sapogenins. By the process of U.S. patent application Serial No. 845,078, filed October 8, 1959, by Albert Wettstein et al., the 16-dehydro-pregnenolone is converted into a $\Delta^{5:17(20)}$-3β:20-diacyloxy-16α-methyl-pregnadiene of the formula

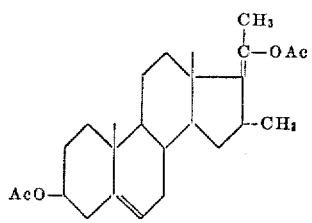

by reaction with an alkyl-magnesium halide in the presence of a copper-(1)-halide and acylating the resulting metal enolate.

The present invention is concerned with the conversion of the $\Delta^{5:17(20)}$-3β:20-diacyloxy-16α-methyl-pregnadienes so obtained into compounds of the formula

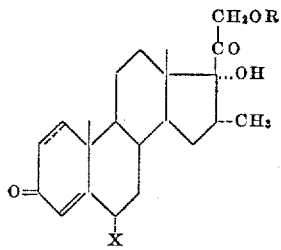

wherein R stands for a hydrogen atom or an acyl group, X for a fluorine or chlorine atom, and wherein an additional double bond may be present in 1,2-position, which compounds then yield directly the active hydrocortisone derivatives, e.g. by a microbiological method through the introduction of an 11β-hydroxyl group. Alternatively, an 11α-hydroxyl group can be introduced microbiologically, e.g. by means of enzymes of Aspergillus ochraceus, the 11α-oxy group then split off in the form of a sulfonic acid ester, and the resulting 9,11-unsaturated compounds converted in known manner into the 9α,11β-halogen hydrins, especially the 9α,11β-fluorohydrins.

This conversion comprises the following steps:

(a) Introduction of a 17α-hydroxyl group by epoxidation of the $\Delta^{17(20)}$-enolacylate, followed by hydrolysis;
(b) Oxidation with peracid of the 5,6-double bond and splitting of the 5,6-epoxide, e.g. with a hydrohalic acid with the formation of a 5α-hydroxy-6β-halogen compound;
(c) Introduction of a 21-acyloxy group by halogenation and exchange with a metal acylate;
(d) Dehydrogenation of the 3-hydroxyl group and dehydration of the 3-keto-5α-hydroxy compound formed.

In performing this known method with the aforementioned starting materials it was surprisingly found that the process can be substantially improved and simplified in that (1) The oxidation of the 17,20- and the 5,6-double bonds can be carried out simultaneously, and
(2) If desired, the mixture of the stereo-isomeric 5,6-epoxides formed during this oxidation can be converted into the unitary 5,6α-epoxide by hydrolysis, esterification with a sulfonic acid and renewed cyclization.

Accordingly, the new process consists in oxidizing with a peracid a $\Delta^{5:17(20)}$-3β:20 diacyloxy-16α-methyl - pregnadiene, if desired, treating the resulting mixture of isomers of the 5:6;17:20-dioxido-3β,20-diacyloxy - 16α-methyl-pregnanes with a mineral acid containing oxygen, and esterifying with a sulfonic acid the secondary hydroxyl group in the resulting 5α,6β-dihydroxy compound, then treating the reaction mass with an alkaline agent, reacting the resulting 5α,6α-oxido-17α - hydroxy - 20-ketone with hydrohalic acid and then with bromine, treating the resulting 21-bromide with a salt of a lower aliphatic carboxylic acid, then, in the resulting 3:17α-dihydroxy-21-acyloxy-5α:6α-oxido-16α-methyl - pregnane, before or after the oxidation of the 3-hydroxy group to the keto group, opening the 5α:6α-oxido group to form the 5α-hydroxy-6β-fluoro hydrin or the 5α-hydroxy-6β-chloro-hydrin, splitting off the 5α-hydroxy group with the formation of the 4,5-double bond, and isomerizing 6β-halogen compounds to 6α-halogen compounds.

The process is illustrated by this diagram of formulae

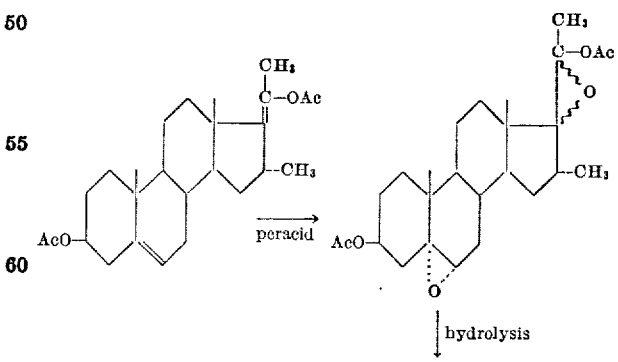

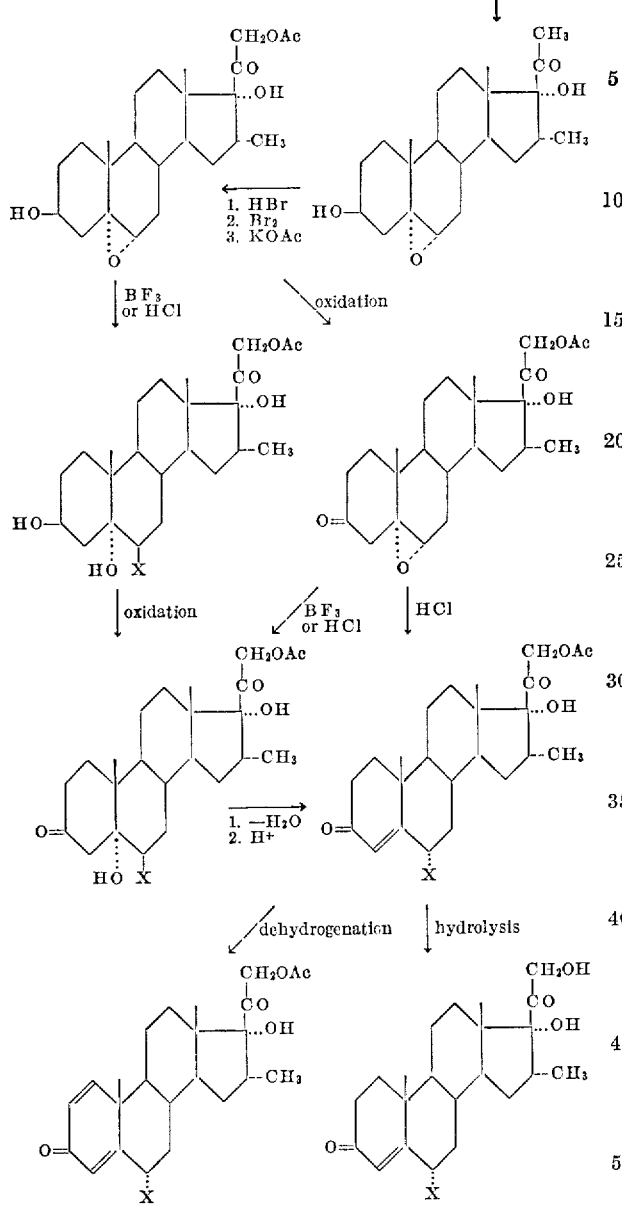

In the above formulae Ac represents an acyl group and X a fluorine or chlorine atom.

For the oxidation of the starting materials according to the present process there are used organic peracids, more especially perbenzoic acid, monoperphthalic acid or peracetic acid, in the presence of a suitable solvent, such as ether and/or a halogenated hydrocarbon.

The acyloxy groups in the 5:6;17:20-diepoxides formed are advantageously hydrolysed with an alkaline agent, such as a solution of a carbonate, bicarbonate or hydroxide of an alkali metal in aqueous methanol or ethanol, dioxane or tetrahydrofuran. Likewise suitable are amines such, for example, as diethylamine, ethylene diamine or ortho-phenylenediamine. It is of advantage to separate the 5α:6α-oxido-3β:17α-dihydroxy-16α-methyl-20 - oxopregnane, of which the product of the hydrolysis consists preponderantly, from the 5β:6β-isomer before the next reaction step by crystallization and/or chromatography on alumina.

In one modification of the present invention, the 5β,6β-isomer can, as aforesaid, be made usable for the preparation of the products of this process by treatment with a mineral acid containing oxygen, e.g. sulfuric acid, either before or after the hydrolysis of the acyloxy groups just described, if desired, after reacetylation in 3-position, esterification with a sulfonic acid, e.g. methane sulfonic acid or para-toluene sulfonic acid, of the secondary hydroxyl group in the 5α,6β-dihydroxy compounds formed, and reaction of the resulting sulfonic acid esters with alkaline agents, e.g. alkali metal hydroxides or alkali metal carbonates, the 5α,6α-oxido-3β,17α-dihydroxy-16α-methyl-pregnane-20-ones or their 3-acylates being formed.

The conversion of β-epoxides into α-epoxides is illustrated by this diagram of formulae:

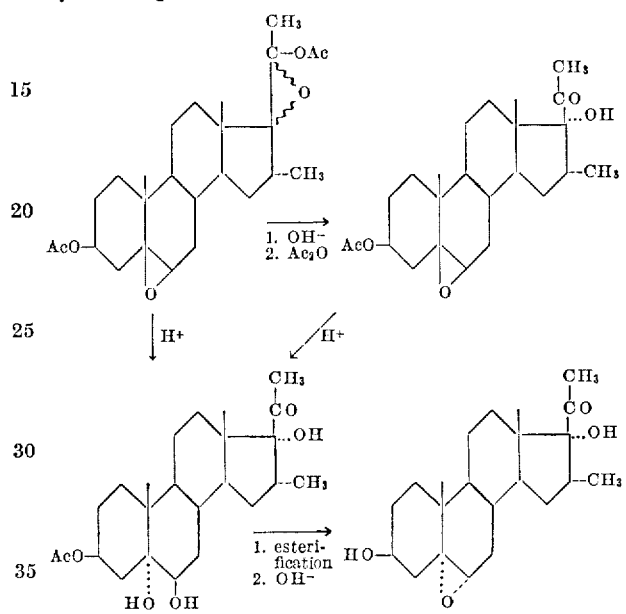

The bromination in the 21-position is advantageously carried out with bromine in a solvent, for example in chloroform or in dioxane, and for initiating the reaction it is of advantage to add an acid, such as hydrochloric or hydrobromic acid. This reaction opens up the 5α:6α-epoxide to form the 5α:6β-halohydrin. The bromine is added as it is, or dissolved in chloroform or glacial acetic acid, or, for example, in the form of dioxane perbromide. The 21-bromide formed can be used for the next step of the synthesis without purification.

The substitution of an acyloxy group for the 21-bromine atom is carried out with the use of an alkali metal salt of an organic acid, such as a sodium or potassium salt of an aliphatic carboxylic acid or low molecular weight, above all with sodium acetate or potassium acetate. The reaction is performed in a solvent, for example in acetone or dimethyl formamide, and it is often of advantage to add a small amount of potassium iodide or sodium iodide to the reaction mixture.

The oxidation of the 3-hydroxyl group to the 3-keto group is advantageously performed with an oxidizing agent that does not affect the side chain, for example chromic acid/pyridine complex or, when the reaction period is short, a mixture of chromic acid, sulfuric acid and acetone; further suitable are N-chloro- or N-bromo-carbonamides or -imides, for example bromosuccinimide or bromacetamide in an aqueous solution, for example in aqueous acetone or pyridine.

The splitting of the 5α:6α-epoxide to yield the 6β-fluoro- or 6β-chloro-5α-hydroxy compound can be carried out before or after oxidation of the 3-hydroxyl group to the 3-keto group, with the use of hydrochloric or hydrofluoric acid in a solvent, such as an alcohol, ketone, ether, halogenated hydrocarbon, for example methylene chloride or chloroform, and preferably in an aliphatic carboxylic acid of low molecular weight, such as glacial acetic acid or propionic acid, or the like, or in a mixture of two or more of the said solvents, advantageously at a temperature within the range of 0 to 30° C. Instead of hydrogen chloride or fluoride may be used pyridine hydrochloride or collidine hydrochloride or boron trifluoride etherate in benzene for splitting the 5α:6α-epoxide. These reactions yield 5α-hydroxy compounds containing a fluorine or chlorine atom in the 6β-position. The 3-hydroxy compound is then oxidized to the corresponding 3-ketone with the use of one of the afore-mentioned oxidizing agents. For the elimination of water the 3-oxo-5α-hydroxy-6β-halogeno compounds are treated with bases, for example potassium hydroxide or with an acid, for example hydrochloric acid, whereby $\Delta^4$-3-keto-6β-halogeno compounds are obtained. Depending on the reaction conditions employed—for example opening the epoxide with hydrogen chloride gas in glacial acetic acid—the $\Delta^4$-3-keto-6α-halogeno compounds can be manufactured in a single reaction step. The isomerization of the $\Delta^4$-3-keto-6β-halogeno compounds to the $\Delta^4$-3-keto-6α - halogeno compounds is advantageously carried out with hydrogen chloride gas in glacial acetic acid.

The 21-acyloxy group of the resulting 21-acyloxy compound can be hydrolysed to the 21-hydroxy group in the usual manner, advantageously with the use of a calculated amount of sodium bicarbonate or hydroxide or potassium bicarbonate or hydroxide, or of sodium methylate or potassium methylate.

The introduction of the 1:2-double bond into a resulting $\Delta^4$ - 3:20-dioxo-17α-hydroxy-21-acyloxy-16α-methyl-pregnene containing in the 6α-position a fluorine or chlorine atom, can be carried out with a selenium compound having a dehydrogenating effect, for example selenium dioxide or selenous acid, in a tertiary alcohol, such as amylene hydrate or tertiary butanol, or by microbiological dehydrogenation. The latter reaction can be performed with any one of the microorganisms conventionally used for this purpose, such, for example, as *Didymella lycopersici, Corynebacterium simplex, Bacillus sphaericus, Mycobacterium lacticola, Fusarium solani,* or *Calonectria decora*.

The $\Delta^{5:17(20)}$-3:20-diacyloxy-16α-methyl - pregnadienes used as starting materials are new; they can be prepared by the process described in U.S. patent application Serial No. 845,078, filed October 8, 1959, by Albert Wettstein et al. by treating $\Delta^{5:16}$-3-acyloxy-20-keto-pregnadienes with a methyl magnesium halide in the presence of a cuprous halide, wherein the reaction with the methyl magnesium halide and the cuprous halide is performed in the presence of tetrahydrofuran and in the absence of methyl halide, and the resulting 20-magnesium enolate is decomposed with an acylating agent.

The final products of the present process, the 6α-fluoro and 6α-chloro derivatives of $\Delta^4$-3:20-dioxo-17α:21-dihydroxy-16α-methyl-pregnene and $\Delta^{1:4}$-3:20-dioxo-17α:21-dihydroxy-16α-methyl pregnadiene, are new. Special mention deserve the following new intermediates:

3β:20-diacyloxy-5α:6α;17:20-dioxide-16α-methyl-pregnanes, for example 3β:20-diacetoxy-5α:6α;17:20-dioxido-16α-methyl pregnadiene in 30 cc. of ether is treated with oxido-16α-methyl-pregnane; 21-acylates, for example the 21-acetates, of 3β:17α:21-trihydroxy-20-oxo-5α:6α-oxido-16α - methyl - pregnane and of 3:20-dioxo-17α:21-dihydroxy-5α:6α-oxido-16α-methyl-pregnane.

The following examples illustrate the invention:

Example 1

A solution of 4.1 grams of $\Delta^{5:17(20)}$-3β:20-diacetoxy-16α-methyl pregnadiene in 30 cc. of ether is treated with 52 cc. of a 0.575 molar ethereal solution of monoperphthalic acid, and the mixture is kept for 48 hours in the dark at room temperature, whereupon the phthalic acid formed and the excess monoperphthalic acid are removed by agitation with aqueous sodium carbonate solution. The ethereal solution is dried with magnesium sulfate and evaporated, and the residue is caused to crystallize by being triturated with methanol. The resulting di-epoxide is a mixture of the four possible isomers which differ by their distinct configuration in the positions 5, 6 and 20. The two isomeric 5α:6α;17α:20-dioxido-3β:20-diacetoxy-16α-methyl-pregnanes can be obtained in the pure state by fractional crystallization from ether. The melting point of the mixture of the two isomers, which differ only by their distinct configuration in the 20-position, is within the range of 165 and 190° C., depending on the ratio of the two isomers.

Example 2

A solution of 4 grams of the mixture of the isomeric 5α:6α;17α:20 - dioxido - 3β:20 - diacetoxy - 16α - methyl-pregnanes in 160 cc. of methanol is treated with a solution of 2 grams of potassium carbonate in 40 cc. of water. The clear reaction mixture is refluxed for 1½ hours and then with stirring diluted with twice its own volume of hot water. The whole is cooled to 0° C. and the crystalline product is filtered off, washed with water until it is free from alkali, and dried in vacuo at 80° C. The 5α:6α - oxido-3β:17α-dihydroxy-16α-methyl-pregnane-20-one obtained in this manner melts at 245° C.

Example 3

A solution of 7.28 grams of 5α:6α-oxido-3β:17α-dihydroxy-16α-methyl-pregnane-20-one in a mixture of 300 cc. of chloroform, 0.3 cc. of alcohol and 1 cc. of hydrobromic acid solution in glacial acetic acid of 36% strength is brominated in a stirring flask, while being irradiated, by adding dropwise 36 cc. of 1.2 N-bromine solution in chloroform. When the addition is complete, the solution is of pale yellow color, and the brominated product begins to crystallize out. After 2 hours, the mixture is cooled for 1 hour at 0° C. and filtered. The resulting 3β:5α:17α-trihydroxy-16α-methyl-6β:21 - dibromo - pregnane-20-one melts at 185° C. with evolution of gas.

A solution of 7.9 grams of 3β:5α:17α-trihydroxy-16α-methyl-6β:21-dibromo-pregnane-20-one in 70 cc. of dimethyl formamide is treated with 7 grams of finely powdered anhydrous sodium acetate and stirred for 6 hours at 60° C. The dimethyl formamide is then expelled in vacuo, the residue is triturated with water, filtered, washed with water and recrystallized from a small amount of methanol. The 5α:6α - oxido - 3β:17α - dihydroxy-16α-methyl-21-acetoxy-pregnane-20-one obtained in this manner melts at 193° C.

Example 4

A solution of 0.25 gram of 5α:6α-oxido-3β:17α-dihydroxy-16α-methyl-21-acetoxy-pregnane-20-one in 2.5 cc. of pyridine is poured into a mixture of 0.25 gram of chromium trioxide and 2.5 cc. of pyridine. The reaction mixture is shaken well and kept for 24 hours at room temperature. The pyridine is then cautiously evaporated in vacuo, the residue is thoroughly triturated with 100 cc. of ether, and the ethereal solution is successively washed with dilute acetic acid, sodium carbonate solution and water, dried and evaporated. The amorphous residue is caused to crystallize by being sprinkled with ether; the crystalline product is filtered off and washed with a small amount of ether, to yield 5α:6α-oxido-16α-methyl-17α-hydroxy-21-acetoxy-pregnane-3:20-dione, which melts at 160° C.

Example 5

A solution of 3.3 grams of 5α:6α-oxido-16α-methyl-17α-hydroxy-21-acetoxy-pregnane-3:20-dione in 400 cc. of a 1:1-mixture of benzene and ether is treated with 3.3 cc. of boron trifluoride ethereate, and the reaction mixture is kept for 8 hours at room temperature, then washed with aqueous sodium bicarbonate solution of 5% strength and with water, dried with magnesium sulfate and evaporated. Purification by crystallization from acetone yields 5α:17α - dihydroxy-6β-fluoro-16α-methyl-21-acetoxy-pregnane-3:20-dione.

When the specified starting material is treated, instead of with boron trifluoride etherate, with hydrogen chloride gas in gacial acetic acid for 18 hours, evaporated, washed until free from acid, dried and recrystallized from acetone+hexane, $\Delta^4$-6α-chloro-16α-methyl-17α-hydroxy-21-acetoxy-pregnene-3:20-dione is obtained.

*Example 6*

A solution of 2.1 grams of 5α:6α-oxido-3β:17α-dihydroxy-16α-methyl-21-acetoxy-pregnane-20-one in 300 cc. of a 1:1-mixture of benzene and ether is treated with 2.1 cc. of boron trifluoride etherate. After 6 hours the reaction mixture is washed with aqueous sodium bicarbonate solution and then with water, dried with magnesium sulfate and evaporated in vacuo. The residue contains the desired 3β:5α:17α-trihydroxy-6β-fluoro-16α-methyl-21-acetoxy-pregnane-20-one which can be converted into the 5α:17α-dihydroxy-6β-fluoro-16α-methyl-21-acetoxy-pregnane-3:20-dione described in Example 5 by oxidation in acetone with excess 8 N-chromic acid at 0° C.

*Example 7*

Dry hydrochloric acid gas is passed for 2 hours at 15° C. into a solution of 1.6 grams of 5α:17α-dihydroxy-6β-fluoro-16α-methyl-21-acetoxy-pregnane-3:20-dione in 16 cc. of acetic acid, and the mixture is then kept for 18 hours at room temperature, then diluted with water and extracted with ether. The ethereal solution is washed with aqueous sodium bicarbonate solution, dried with magnesium sulfate and evaporated.

The resulting crude $\Delta^4$-6α-fluoro-16α-methyl-17α-hydroxy-21-acetoxy-pregnene-3:20-dione can be purified by chromatography on silica gel.

To hydrolyse the 21-acetate, 100 mg. of $\Delta^4$-6α-fluoro-16α-methyl-17α-hydroxy-21-acetoxy-pregnene-3:20-dione are dissolved in 10 cc. of absolute methanol, the solution is treated for 3 minutes with 1.28 cc. of 0.2 molar methanolic sodium methylate solution, poured over a mixture of ice and aqueous sodium bicarbonate, and the reaction mixture is then extracted with chloroform. The chloroformic extracts are washed with water, dried over magnesium sulfate and evaporated. Crystallization of the residue from acetone+hexane yields $\Delta^4$-6α-fluoro-16α-methyl-17α:21-dihydroxy-pregnene-3:20-dione.

*Example 8*

A solution of 3 grams of $\Delta^4$-6α-fluoro-16α-methyl-17α-hydroxy-21-acetoxy-pregnene-3:20-dione in 100 cc. of tertiary amyl alcohol is treated with 3 cc. of glacial acetic acid and 3 grams of mercury, and while boiling and vigorously stirring this mixture, it is treated dropwise within 8 hours with a solution of 1.3 grams of selenium dioxide in 30 cc. of tertiary amyl alcohol. On completion of the addition, the mixture is boiled on for 8 hours, whereupon the selenium is filtered off with the aid of carbon. The filtrate is diluted with ethyl acetate, washed with aqueous sodium carbonate solution and with water, dried with magnesium sulfate and evaporated in vacuo. The resulting crude $\Delta^{1,4}$-6α-fluoro-16α-methyl-17α-hydroxy-21-acetoxy-pregnadiene-3:20-dione can be purified by chromatography on alumina and crystallization from acetone+hexane.

*Example 9*

A suspension of 5 grams of a mixture of 3β:17α-dihydroxy-5α:6α-oxido-16α-methyl-allopregnane-20-one and 3β:17α-dihydroxy-5β:6β-oxido-16α-methyl-allopregnane-20-one in 30 cc. of pyridine is treated with 20 cc. of acetanhydride while being cooled. After 2 hours a clear solution is obtained. The reaction mixture is kept for 20 hours at room temperature and then cautiously evaporated in vacuo in a rotary evaporator. The residue is taken up in a mixture of 80 cc. of ethyl acetate and 10 cc. of water, and the organic layer is washed successively with sodium bicarbonate solution, dilute hydrochloric acid and sodium chloride solution, dried and concentrated to a volume of 10 cc. The hot solution is mixed with 50 cc. of pentane and allowed to crystallize in an ice box. Yield: 5.17 grams (=approximately 93% of theory). The resulting 3-acetate melts at 156–164° C.

A solution of 0.91 gram of a 5:6-isometric mixture of 3β-acetoxy-5:6-oxido-16α-methyl-17α-hydroxy-allopregnane-20-one in 70 cc. of acetone is diluted with 30 cc. of water and treated with 1.2 cc. of sulfuric acid of 10% strength. The clear solution is kept for 72 hours at room temperature and the acetone is then distilled off in vacuo, to yield 3β-acetoxy-5α:6β:17α-trihydroxy-16α-methyl-allopregnane-20-one which melts at 235–238° C. after having been recrystallized from methanol. Yield: 81% of theory.

A solution of 0.4 gram of 3β-acetoxy-5α:6β:17α-trihydroxy-16α-methyl-allopregnane-20-one in 5 cc. of pyridine is treated with 500 mg. of methanesulfonyl chloride while being cooled with ice. The reaction mixture is kept for 16 hours at 0° C. and for 3 hours at room temperature, then poured over ice, taken up in ether, and the etheral solution is washed successively with dilute hydrochloric acid, sodium bicarbonate solution and water, dried, and concentrated to a volume of 10 cc. Yield: 0.36 gram of crystalline 3β-acetoxy-5α:17α-dihydroxy-6β-mexyloxy-16α-methyl-allopregnane-20-one which decomposes at 170–172° C. Yield 64% of theory.

A solution of 0.17 gram of 3β-acetoxy-5α:17α-dihydroxy-6β-mexyloxy-16α-methyl-allopregnane-20-one in 13.5 cc. of methanol is treated with 68 mg. of solid potassium hydroxide. The reaction mixture is refluxed for 3 hours, treated with 10 cc. of water, and freed in vacuo in a rotary evaporator from methanol, whereupon the product is obtained in finely crystalline form. After having been filtered off and dried, the product weighs 0.11 gram (=approximately 90% of theory). It melts at 220–225° C. while turning slightly brown and is identical with the 3β:17α-dihydroxy-5α-6α-oxido-16α-methyl-allopregnane-20-one prepared as described in Example 2.

*Example 10*

2 grams of a mixture of 5α:6α;17α:20-dioxido- and 5β:6β;17α:20-dioxido-3β:20-diacetoxy-16α-methyl-pregnane prepared as described in Example 1 are dissolved in 100 cc. of benzene and 100 cc. of acetone, 1.2 cc. of sulfuric acid of 20% strength are added, and the whole is refluxed for 1 hour. The reaction mixture is treated with 2 cc. of pyridine and concentrated to a volume of about 40 cc. 50 cc. of benzene are then added, and the mixture is again concentrated to 40 cc. The residue is treated with 20 cc. of pyridine, and at 0° C. 2 grams (=1.32 cc.) of a methanesulfonyl chloride are added in portions. The reaction mixture is kept for 14 hours at 0° C. and then for 6 hours at room temperature. To perform the hydrolysis, a solution of 3 grams of potassium hydroxide in 400 cc. of methanol is added, the mixture is refluxed for 3 hours, 200 cc. of water are added, and the whole is concentrated in a rotary evaporator to a volume of about 50 cc., whereupon 5α:6α-oxido-3β:17α-dihydroxy-16α-methyl-pregnane-20-one precipitates which melts at 220–225° C. Yield 1.25 grams.

If desired, the treatment with sulfuric acid can be followed by isolation of 3β-acetoxy-5α:6β:17α-trihydroxy-16α-methyl-pregnane-20-one (M.P. 215–220° C.) which is then further reacted as described in Example 9.

What is claimed is:

1. Process for the manufacture of halogen-pregnanes, wherein a $\Delta^{5:17(20)}$-3β:20-diacyloxy-16α-methyl-pregnadiene is oxidized with a peracid, the reaction product is treated with an alkaline agent, the resulting 5α:6α-oxido-17α-hydroxy-20-ketone is reacted with hydrohalic acid and then with bromine, the resulting 21-bromide is treated with a salt of a lower aliphatic carboxylic acid, then in the resulting 3:17α-dihydroxy-21-acyloxy-5α:6α-oxido-16α-methyl-pregnane the 3-hydroxy group is oxidized to the keto group, the 5α:6α-oxido 3-keto group, the resulting 5α:6α-oxido compound is reacted with a member of the group consisting of hydrochloric acid, hydrofluoric acid, a tertiary amine salt thereof and boron trifluoride to form a member selected from the group consisting of 5α-hydroxy-6β-fluorohydrin and the 5α-hydroxy-6β-chloro-hydrin, said compounds are dehydrated with a member of the group consisting of a base and an acid whereby the 4:5-double bond is formed, and the 6β-halogen compound is isomerized with an acid to the 6α-halogen compound.

2. Process for the manufacture of halogen-pregnanes, wherein a $\Delta^{5;17(20)}$-3β:20-diacyloxy-16α-methyl-pregnadiene is oxidized with a peracid, the resulting mixture of isomers of the 5:6;17α:20-dioxido-3β:20-diacyloxy-16α-methyl-pregnanes is reacted with an oxygen containing mineral acid and the secondary hydroxyl group in the resulting 5α-6β-dihydroxy compound is esterified with a sulfonic acid, then the reaction product is treated with an alkaline agent, the resulting 5α:6α-oxido-17α-hydroxy-20-ketone is reacted with hydrohalic acid and then with bromine, the resulting 21-bromide is treated with a salt of a lower aliphatic carboxylic acid, then in the resulting 3:17α-dihydroxy-21-acyloxy-5α:6α-oxido-16α-methyl-pregnane the 3-hydroxy group is oxidized to the 3-keto group, the resulting 5α:6α-oxido compound is reacted with a member of the group consisting of hydrochloric acid, hydrofluoric acid, a tertiary amine salt thereof and boron trifluoride to form a member selected from the group consisting of 5α-hydroxy-6β-fluoro-hydrin and 5α-hydroxy-6β-chloro-hydrin, said compounds are dehydrated with a member of the group consisting of a base and an acid whereby the 4:5-double bond is formed, and the 6β-halogen compound is isomerized with an acid into the 6α-halogen compound.

3. Process as claimed in claim 1, wherein $\Delta^{5;17(20)}$-3β-20-diacetoxy-16α-methyl-pregnadiene is used as starting material.

4. The 3β:20-diacetoxy-5α:6α;17α:20 - dioxido - 16α-methyl-pregnane.

5. The 3β:17α-dihydroxy-20-oxo-5α:6α - oxido - 16α-methyl-pregnane.

6. The 21 - acetate of 3β:17α:21-trihydroxy-20-oxo-5α:6α-oxido-16α-methyl-pregnane.

7. The 21-acetate of 3:20 - dioxo - 17α:21-dihydroxy-5α:6α-oxido-16α-methyl-pregnane.

8. A 3β:20-lower aliphatic carboxylic acid ester of 3β:20-dihydroxy-5α:6α;17α:20-dioxido-16α-methyl - pregnane.

9. A 21-lower aliphatic carboxylic acid ester of 3β:17α:21-trihydroxy-20 - oxo-5α:6α-oxido-16α - methyl-pregnane.

10. A 21-lower aliphatic carboxylic acid ester of 3:20-dioxo-17α:21-dihydroxy-5α:6α-oxido-16α - methyl - pregnane.

References Cited in the file of this patent
UNITED STATES PATENTS
2,983,737     Djerassi et al. _____ May 9, 1961

UNITED STATES PATENT OFFICE

CERTIFICATE OF CORRECTION

Patent No. 3,081,297                                          March 12, 1963

Albert Wettstein et al.

It is hereby certified that error appears in the above numbered patent requiring correction and that the said Letters Patent should read as corrected below.

Column 9, line 16, for "5α-6β-dihydroxy" read -- 5α: 6β-dihydroxy --; column 10, line 6, for "3β-20-diacetoxy" read -- 3β:20-diacetoxy --.

Signed and sealed this 5th day of May 1964.

(SEAL)
Attest:

ERNEST W. SWIDER                                    EDWARD J. BRENNER

Attesting Officer                                         Commissioner of Patents